Sept. 4, 1951  W. H. LINDSEY  2,566,618
TURBINE DRIVING AIRCRAFT ACCESSORY
Filed Sept. 1, 1948

INVENTOR
WILLIAM HENRY LINDSEY
By Mawhinney + Mawhinney
ATTORNEYS

Patented Sept. 4, 1951

2,566,618

UNITED STATES PATENT OFFICE 2,566,618

TURBINE DRIVING AIRCRAFT ACCESSORY

William H. Lindsey, Coventry, England, assignor to Armstrong Siddeley Motors Limited, Coventry, England Application September 1, 1948, Serial No. 47,302
In Great Britain November 25, 1947

5 Claims. (Cl. 290—52)

This invention relates to an aircraft such as is powered by at least one internal-combustion turbine plant, which may propel the aircraft by means of its exhaust jet or which may drive one or more screw propellers.

Due to the high speed at which such a turbine plant operates (for example, 15,000 revolutions per minute), difficulty is encountered in supplying electric power for the various aircraft accessories—e. g., power for heating, lighting, and cooking, for "pressurising" the cabin, for de-icing the wings, and controls, and possibly the airscrews if used, and for electric servo mechanisms for the controls, undercarriage and the like. A common arrangement, at the present time, involves the use of a main electric generator disposed well remote from the power plant and driven from a step-up gearing which in turn is driven by a relatively-long shaft incorporating possibly two universal joints, the shaft being driven from an appropriate part of the power plant through a material step-down gearing. Not only are these parts relatively-heavy and cumbersome but there is a material loss of efficiency in such a drive. For example, the speed of the relatively-long shaft may be about 3000 revolutions per minute, and of the generator about 10,000.

The invention broadly consists in incorporating a high-speed electric generator in the power plant itself, the main shaft of the power plant, or one of the main shafts, serving to carry the rotor of the electric generator, such rotor being, of course, associated with a surrounding stator. In such a case the electric generator will operate at, say, a speed of 15,000 revolutions per minute and, in consequence, it can be of relatively-small size even when giving an output of, say, sixty or seventy-five kilowatts or more, such as may be required for all the aircraft accessories; though in other cases, of course, a much smaller output will be all that will be required.

According to a further feature of the invention, the generator is disposed between the compressor of the plant and the nearest turbine section, being mounted radially within a combustion chamber unit extending between the compressor and the turbine section. In this case neither the radial or axial size of the power plant need be increased.

According to a further feature of the invention, the generator is a dynamo-electric machine of the kind adapted to serve also as a starting motor for the power plant.

Figure 1:
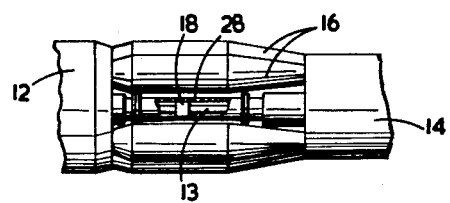
Figure 1 is a fragmentary view, in part-sectional elevation, of an internal-combustion turbine plant, adapted according to the invention, for powering an aircraft.

Figure 1 indicates the outline of the output end 12 of an axial-flow compressor of the plant, the rotor of the compressor being driven by a shaft 13 from an axial-flow turbine section indicated in outline at 14. The compressor and nearest turbine section are axially spaced from one another. The combustion chamber unit in this case comprises six similar elongated combustion chambers 16, 16 arranged in a circle round the axis of the shaft 13. The combustion chambers receive compressed air from the outlet end of the compressor and, with fuel added in the chambers, deliver the products of combustion to the inlet of the turbine section 14, all in a manner well-known in regard to an axial-flow internal-combustion turbine plant.

In the present instance a dynamo-electric machine 18, for generating electric power for supplying the various aircraft accessories, is mounted between the compressor 12 and the turbine section 14 within the interior of the combustion chamber unit, being driven directly by the shaft 13.

Figure 3:
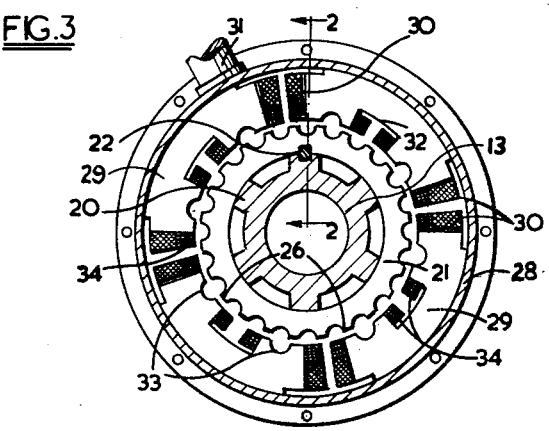
Figure 3 is a cross-section thereof taken mainly on the line 3—3 of Figure 2.
Figure 2:
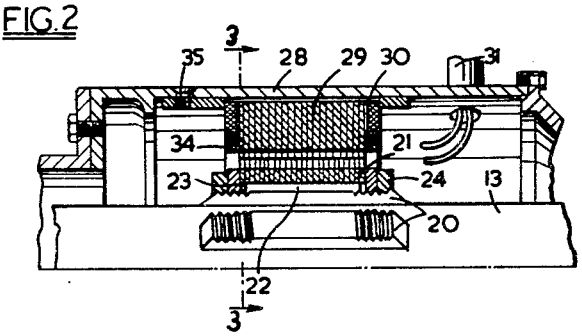
Figure 2 is a fragmentary longitudinal section, to a larger scale, through one form of dynamo-electric machine, taken mainly on the line 2—2 of Figure 3, but with the shaft shown in elevation.

With reference now to Figures 2 and 3, these show the shaft 13 as having, between its ends, an enlarged portion 20 which may be fluted as shown for cooling purposes and upon which is mounted the winding-free (coil-less) rotor of the machine. This rotor consists of a plurality of similar annular permanent magnet laminations 21, 21 secured to the enlarged portion 20 against angular movement by means of a key 22, being endwise located on the enlarged portion in any convenient manner, as by means of end plates 23, 23 and retaining nuts 24, 24 (Figure 2). The rotor is shown by way of example as having twenty-four poles 26, 26.

Surrounding and spaced radially from the shaft 13 is a stationary casing 28 from the internal periphery of which the stator of the dynamo-electric machine is supported. The stator is shown as comprising four arcuate laminated portions 29, 29 each carrying an alternating current winding 30, 30 round it from which the generated voltage can be delivered by conductors passing within the conduit 31 secured to the casing 28 and passing between two of the combustion chambers 16. Each of the arcuate portions 29 is gapped as shown at 32 (Figure 3), leaving two main pole pieces 33, 33 sub-divided into two poles, and each of these main pole pieces 33 carries a direct current winding 34, 34 round it to be energised from a battery (not shown) carried by the aircraft, the conductors thereof also being led along the conduit 31. A fixing means for the stator is indicated at 35 in Figure 2.

The particular dynamo-electric machine illustrated is adapted to generate, say, 10 kilowatts at 5,000 cycles and at 50 to 100 volts when the rotor is operating at 15,000 revolutions per minute. Obviously, however, larger outputs can be obtained as by increasing the axial length of the machine, or duplicating or triplicating it as desired.

For cooling the machine compressed air may be bled from the compressor and passed through the machine. The machine is in a very favourable position in this respect between the compressor and the turbine; and with such special cooling a relatively large output can be obtained from a relatively small machine.

What I claim as my invention and desire to secure by Letters Patent of the United States is:

1. For an aircraft, an internal-combustion turbine plant including a turbine and a coaxial rotary-type compressor having a common rotor shaft and being axially-spaced by a plurality of combustion chambers extending between them and arranged in a circle round said shaft, said combustion chambers receiving compressed air from the compressor and delivering it admixed with fuel to drive the turbine, in combination with a dynamo-electric machine, arranged within the circle of said combustion chambers and between the adjacent ends of said turbine and compressor, and comprising a rotor fast with said shaft and a stator surrounding said rotor.

2. For an aircraft, an internal-combustion turbine plant including a turbine and a coaxial rotary-type compressor having a common rotor shaft and being axially-spaced by a plurality of combustion chambers extending between them and arranged in a circle round said shaft, said combustion chambers receiving compressed air from the compressor and delivering it admixed with fuel to drive the turbine, in combination with a dynamo-electric machine, arranged within the circle of said combustion chambers and between the adjacent ends of said turbine and compressor, and comprising a multipolar permanent magnet rotor fast with said shaft and a stator having a multipolar winding and surrounding said rotor.

3. For an aircraft, an internal-combustion turbine plant including a turbine and a coaxial rotary-type compressor having a common rotor shaft and being axially-spaced by a plurality of combustion chambers extending between them and arranged in a circle round said shaft, said combustion chambers receiving compressed air from the compressor and delivering it admixed with fuel to drive the turbine, an enlarged fluted portion of said shaft intermediate said turbine and compressor, a multipolar permanent magnet fast with said enlarged shaft portion and forming the rotor of a dynamo-electric machine arranged within the circle of said combustion chambers, and a coacting stator for said rotor supported from the adjacent ends of casings of said turbine and compressor, said stator surrounding said rotor and having a multipolar winding, and the flutes of said flutted portion providing internal cooling ducts for said rotor.

4. For an aircraft, an internal-combustion turbine plant including a turbine and a coaxial rotary-type compressor having a common rotor shaft and being axially-spaced by a plurality of combustion chambers receiving compressed air from the compressor and delivering it admixed with fuel to drive the turbine, an enlarged fluted portion of said shaft intermediate said turbine and compressor, a plurality of multipolar permanent magnet laminations rotatively fast with said enlarged shaft portion, means providing endwise location for said laminations, the latter forming the rotor of a dynamo-electric machine arranged within the circle of said combustion chambers, a tube concentrically surrounding and radially-spaced from said rotor, said tube being radially within the circle of combustion chambers and supported at its ends from the adjacent ends of casings of the turbine and compressor, and a stator having a multipolar winding for coaction with said rotor and being fast within said tube.

5. For an aircraft, an internal-combustion turbine plant including a turbine and a coaxial rotary-type compressor having a common rotor shaft and being axially-spaced by a plurality of combustion chambers extending between them and arranged in a circle round said shaft, said combustion chambers receiving compressed air from the compressor and delivering it admixed with fuel to drive the turbine, an enlarged fluted portion of said shaft intermediate said turbine and compressor, a rotor of a dynamo-electric machine arranged within the circle of said combustion chambers, said rotor being fast on said fluted shaft portion of which latter the flutes form internal cooling passages for the rotor, a tube concentrically surrounding and radially spaced from said rotor, said tube being radially within said circle of combustion chambers and supported at its ends from bearing housings for said shaft at the adjacent ends of said turbine and compressor, and a stator surrounding said rotor and being fast within said tube, the latter also serving as a conduit for air which passes out of said compressor from its said bearing housings for cooling aid dynamo-electric machine.

WILLIAM H. LINDSEY.

REFERENCES CITED

The following references are of record in the file of this patent:

UNITED STATES PATENTS

| Number | Name | Date |
|---|---|---|
| 908,097 | Herz | Dec. 29, 1908 |
| 1,959,795 | Lysholm | May 22, 1934 |
| 2,071,536 | Kalin | Feb. 23, 1937 |
| 2,119,092 | Bernard | May 31, 1938 |
| 2,180,168 | Puffer | Mar. 14, 1939 |
| 2,358,815 | Lysholm | Sept. 26, 1944 |